US009325655B1

(12) United States Patent
Bilinski et al.

(10) Patent No.: US 9,325,655 B1

(45) **Date of Patent: *Apr. 26, 2016**

(54) USER NOTIFICATION DIGESTION

(71) Applicant: Google Inc., Mountain View, CA (US)

(72) Inventors: Brandon Bilinski, San Francisco, CA (US); Alexander Collins, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,979

(22) Filed: Oct. 13, 2014

Related U.S. Application Data

(63) Continuation of application No. 13/646,358, filed on Oct. 5, 2012, now Pat. No. 8,862,676.

(60) Provisional application No. 61/663,277, filed on Jun. 22, 2012.

(51) Int. Cl.

| | |
|---|---|
| ***G06F 15/16*** | (2006.01) |
| ***H04L 12/58*** | (2006.01) |
| ***H04L 29/08*** | (2006.01) |

(52) U.S. Cl.

CPC ................ *H04L 51/24* (2013.01); *H04L 67/26* (2013.01)

(58) Field of Classification Search

USPC ....................... 709/203, 200, 206, 217; 726/3

See application file for complete search history.

(56) References Cited

U.S. PATENT DOCUMENTS

| | | | |
|---|---|---|---|
| 7,177,859 B2 | 2/2007 | Pather et al. | |
| 7,209,916 B1 | 4/2007 | Seshadri et al. | |
| 2001/0016875 A1 | 8/2001 | Schwartz et al. | |
| 2004/0002972 A1* | 1/2004 | Pather et al. | 707/6 |
| 2004/0002988 A1* | 1/2004 | Seshadri et al. | 707/102 |
| 2010/0223467 A1 | 9/2010 | Dismore et al. | |
| 2013/0078958 A1 | 3/2013 | Kyprianou | |

* cited by examiner

*Primary Examiner* — El Hadji Sall

(74) *Attorney, Agent, or Firm* — Patent Law Works LLP

(57) ABSTRACT

A system, computer program product and method for dynamically digesting one or more user notifications based at least in part on one or more rules are disclosed. In some implementations, the system includes a notification receiver module, a rule application module and a notification digestion module. The notification receiver module receives notifications including a first notification. The rule application module obtains rules for determining a send condition including a delay time and a maximum delay time, sets the delay time and the max delay time, determines whether another notification is received within the delay time, resets the delay time responsive to another notification being received within the delay time, and repeats the determination and delay time reset until a send condition occurs. The notification digestion module, responsive to the send condition occurring, digests the notification(s) received prior to the send condition and sends a digested notification to the user.

20 Claims, 7 Drawing Sheets

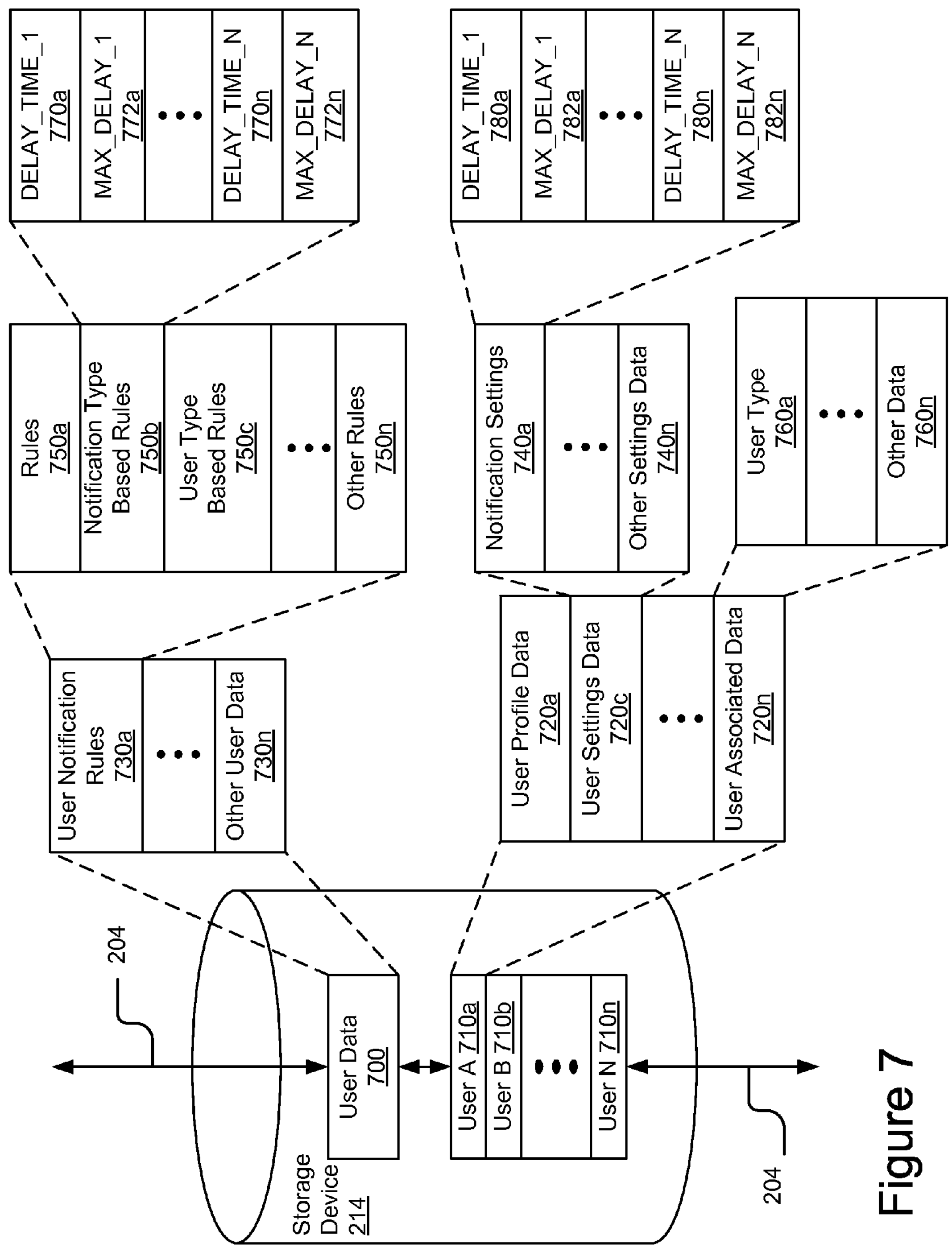
DELAY_TIME_1 770a
MAX_DELAY_1 772a
DELAY_TIME_N 770n
MAX_DELAY_N 772n
DELAY_TIME_1 780a
MAX_DELAY_1 782a
DELAY_TIME_N 780n
MAX_DELAY_N 782n
Rules 750a
Notification Type Based Rules 750b
User Type Based Rules 750c
Other Rules 750n
Notification Settings 740a
Other Settings Data 740n
User Type 760a
Other Data 760n
User Notification Rules 730a
Other User Data 730n
User Profile Data 720a
User Settings Data 720c
User Associated Data 720n
204
User Data 700
User A 710a
User B 710b
User N 710n
Storage Device 214
204
Figure 7

USER NOTIFICATION DIGESTION

CROSS-REFERENCE TO RELATED APPLICATIONS

This application is a continuation of and claims priority to U.S. application Ser. No. 13/646,358, filed Oct. 5, 2012, titled "User Notification Digestion," which claims the benefit under 35 U.S.C. §119(e) of U.S. Patent Application No. 61/663,277, entitled "User Notification Digestion" filed Jun. 22, 2012, the entire contents of which are incorporated herein by reference.

BACKGROUND

Online businesses and services may send account owners notifications. For example, social networking sites may send an account owner notifications when a user interacts with data associated with the account owner. However, sending each notification individually to the account owner may inconvenience the account owner, for example, by filling the account owner's inbox. Systems have been developed to reduce the number of notifications received by an account owner using fixed notification schedules. For example, sending a summary of the notifications to the user once a week at a fixed time.

However, a first problem with the current systems is that a notification for an interaction just after the summary is sent must wait almost an entire week to be received by the account owner, which may be too long for the notification be relevant or useful. A second problem is that different notification types may have different shelf lives and different account owners may desire to receive notifications more or less frequently. More specifically, the current systems do not dynamically digest one or more user notifications based at least in part on one or more rules.

SUMMARY

The specification relates to online user notification.

According to one innovative aspect of the subject matter described in this disclosure, a computer program product comprises a non-transitory computer readable medium encoding instructions that, in response to execution by a computing device, cause the computing device to perform operations comprising receiving a first notification; obtaining rules for determining a send condition, wherein the rules include a delay time and a maximum delay time; setting the delay time and the max delay time; determining whether another notification is received within the delay time; resetting the delay time responsive to the another notification being received within the delay time; repeating the determination and delay time reset until one or more of the notification send conditions occur, wherein the notification send condition is one or more of the max delay time being reached and the another notification not being received within the delay time; and responsive to the send condition occurring, digesting the notification(s) received prior to the send condition and sending a digested notification to an account owner, wherein the digested notification includes information based at least in part on the notification(s) received prior to the send condition.

In general, another innovative aspect of the subject matter described in this disclosure may be embodied in methods that include receiving a first notification; obtaining rules for determining a send condition, wherein the rules include a delay time and a maximum delay time; setting the delay time and the max delay time; determining whether another notification is received within the delay time; resetting the delay time responsive to the another notification being received within the delay time; repeating the determination and delay time reset until one or more of the notification send conditions occur, wherein the notification send condition is one or more of the max delay time being reached and the another notification not being received within the delay time; and responsive to the send condition occurring, digesting the notification(s) received prior to the send condition and sending a digested notification to an account owner, wherein the digested notification includes information based at least in part on the notification(s) received prior to the send condition.

Other aspects include corresponding methods, systems, apparatus, and computer program products." or "Other implementations of one or more of these aspects include corresponding systems, apparatus, and computer programs, configured to perform the actions of the methods, encoded on computer storage devices.

These and other implementations may each optionally include one or more of the following features. Determining the notification type of the first notification and that the another notification has the same notification type as the first notification. The one or more of the rules are based at least in part on the type of notification. Determining that the first notification is one or more of a high frequency and bursty notification type, and the another notification is determined to have the same notification type as the first notification. One or more of the rules are dynamic. One or more of the rules is determined based at least in part on the account owner's user type. The user type is automatically determined. The user type is self-selected by the account owner. One or more of the rules is determined based at least in part on a preference. One or more of the rules are based at least in part on the account owner's notification settings. One or more of the rules are based at least in part on a quiet period. The digested notification includes a summary of the notification(s) received prior to the send condition. The digested notification is sent via one or more of e-mail, SMS text and a push notification.

Advantages of the disclosure may include the dynamic digestion of one or more notifications which may result in fewer notifications being received by an account owner. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

FIG. 7 is a block diagram illustrating an example storage device storing one or more rules on a storage device in the system.

DETAILED DESCRIPTION

Figure 1:
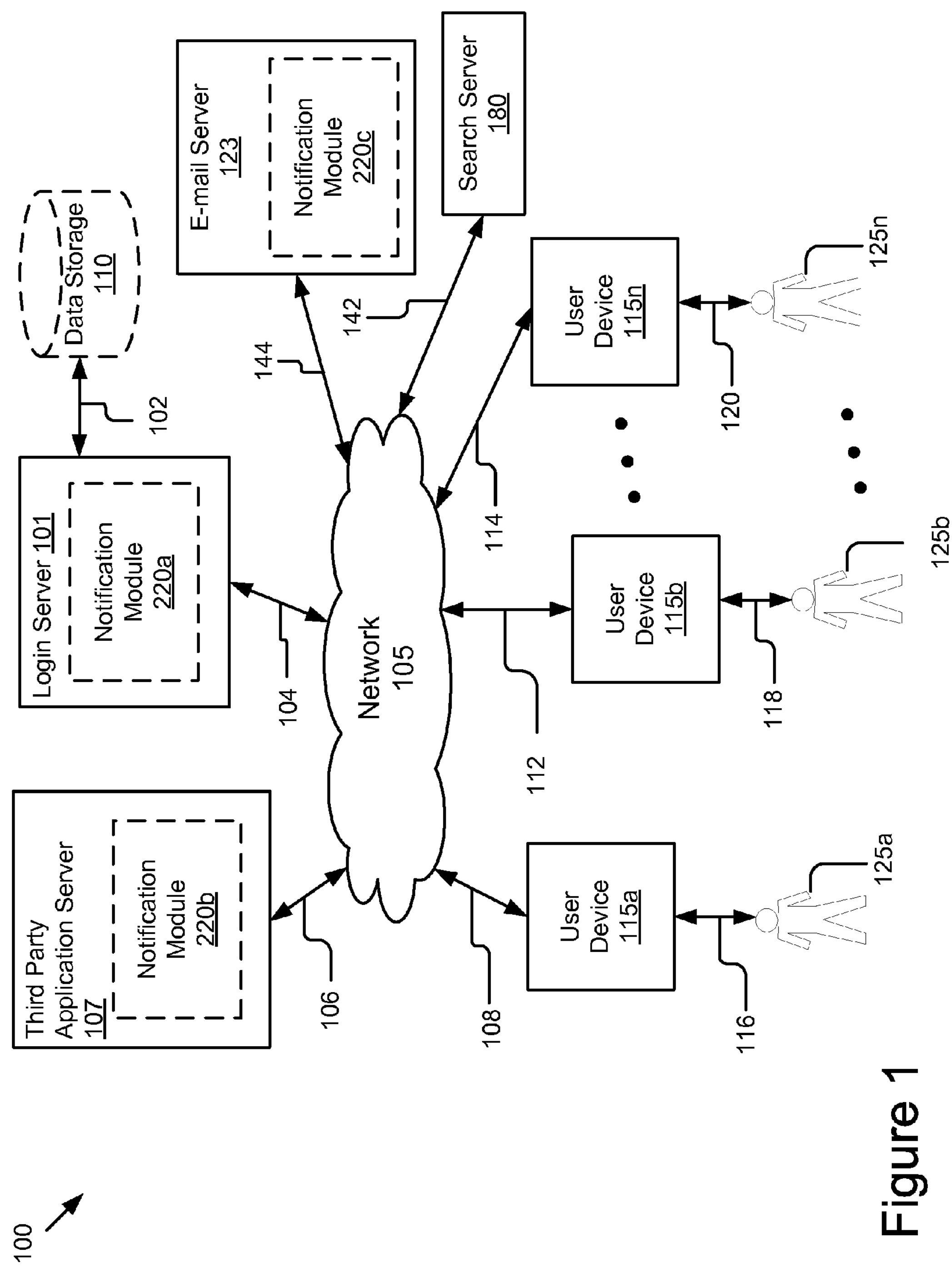
FIG. 1 a block diagram illustrating an example of a system for dynamically digesting one or more user.

A system and method for dynamically digesting one or more user notifications based at least in part on one or more rules are described. In the following description, for purposes of explanation, numerous specific details are set forth in order to provide a thorough understanding of the implementations. It will be apparent, however, that the implementations can be practiced without these specific details. In other instances, structures and devices are shown in block diagram form in order to avoid obscuring the implementations. For example, some implementations are described below with reference to user interfaces and particular hardware. However, the present implementations apply to any type of computing device that can receive data and commands, and any peripheral devices providing services.

Reference in the specification to "some implementations" or "an implementation" means that a particular feature, structure, or characteristic described in connection with the implementation is included in at least some implementations. The appearances of the phrase "in some implementations" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 illustrates a block diagram of a system 100 for dynamically digesting one or more user notifications based at least in part on one or more rules according to some implementations. The illustrated system 100 includes user devices 115*a*, 115*b*, and 115*n* (also referred to collectively as user devices 115 or individually as user device 115) that are accessed by users 125*a*, 125*b*, and 125*n* (also referred to collectively as users 125 or individually as user 125), an application server 101, a search server 180, an e-mail server 123 and a third party server 107. In the illustrated implementation, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the application server 101, the search server 180, the e-mail server 123 and the third party server 107, in practice any number of networks 105 can be connected to the entities. Furthermore, while only one third party server 107 is shown, the system 100 can include any number of third party servers 107.

Although only one application server 101 is shown, it will be recognized that multiple servers may be present. In some implementations, the application server 101 includes, or is included within, a social network. A social network may be any type of social structure where the users are connected by a common feature. Examples include, but are not limited to, blogs, microblogs and Internet forums. The common feature includes friendship, family, a common interest, etc.

In some implementations, a notification module 220*a* is included in the application server 101 and is operable on the application server 101, which is connected to the network 105 via signal line 104. In some implementations, the notification module 220*b* is included in the third party application server 107 and is operable on the third party application server 107, which is connected to the network 105 via signal line 106. In some implementations, the notification module 220*c* is included in the e-mail server 123 and is operable on the e-mail server 123, which is connected to the network 105 via signal line 144. In some implementations, a user authentication module (not shown) may be included in the search server 180 and is operable on the search server 180, which is connected to the network 105 via signal line 142. It will be recognized that the notification module 220*a*/220*b*/220*c* (referred to generally as the notification module 220) can be stored in any combination on the servers and user devices 115. In some implementations the notification module 220 includes multiple, distributed modules that cooperate with each other to perform the functions described below. Details describing the functionality and components of the notification module 220 are explained in further detail below with regard to FIG. 3.

The network 105 enables communications between user devices 115, the application server 101, the user application servers 130, the search server 180, the e-mail server 123 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 105 can also include links to other networks.

In some implementations, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In some implementations, the network 105 is an IP-based wide or metropolitan area network.

In some implementations, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated implementation, the user devices 115*a*, 115*b* and 115*n* are coupled to the network 105 via signal lines 108, 112 and 114, respectively. The user 125*a* can interact with the user device 115*a* as illustrated by signal line 116. Similarly, the user 125*b* can interact with the user device 115*b* as illustrated by signal line 118, and the user 125*n* can interact with the user device 115*n* as illustrated by signal line 120. The third party application server 107 is communicatively coupled to the network 105 via signal line 106. The e-mail server 123 is communicatively coupled to the network 105 via signal line 144. The search server 180 is communicatively coupled to the network 105 via signal line 142. The application server 101 is communicatively coupled to the network 105 via signal line 104. In some implementations, the application server 101 is communicatively coupled to data storage 110 via signal line 102.

In some implementations, the data storage 110 stores data and information associated with one or more rules relevant to digesting one or more notifications. For example, the data storage 110 stores one or more of a rule, a notification type based rule, a user type based rule, etc. In some implementations, the data storage 110 stores data and information of each user 125 of the application server 101. In some implementations, the stored data and information includes information and data associated with one or more of the user type of each user 125 and each user's user settings (e.g. notification settings, which may include one or more rules). In some implementations, which is discussed below, a storage device 214 (see FIG. 2) is included in the application server 101 (i.e., a computing device 200) and the storage device 214 stores the data and information discussed above in reference to the data storage 110.

In some implementations, the user device 115 is an electronic device having a web browser (not shown) for interacting with the various servers 101, 107, 123, 180 and user devices 115 of the system 100 via the network 105 and is used by a user 125 to access information in the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network. It will be recognized that other types of client devices 115 are possible. In some implementations, the system 100 includes a combination of different types of client devices 115. For example, a combination of a personal computer, a mobile phone and a tablet computer. The user 125 is a human user of the user device 115.

Figure 2:
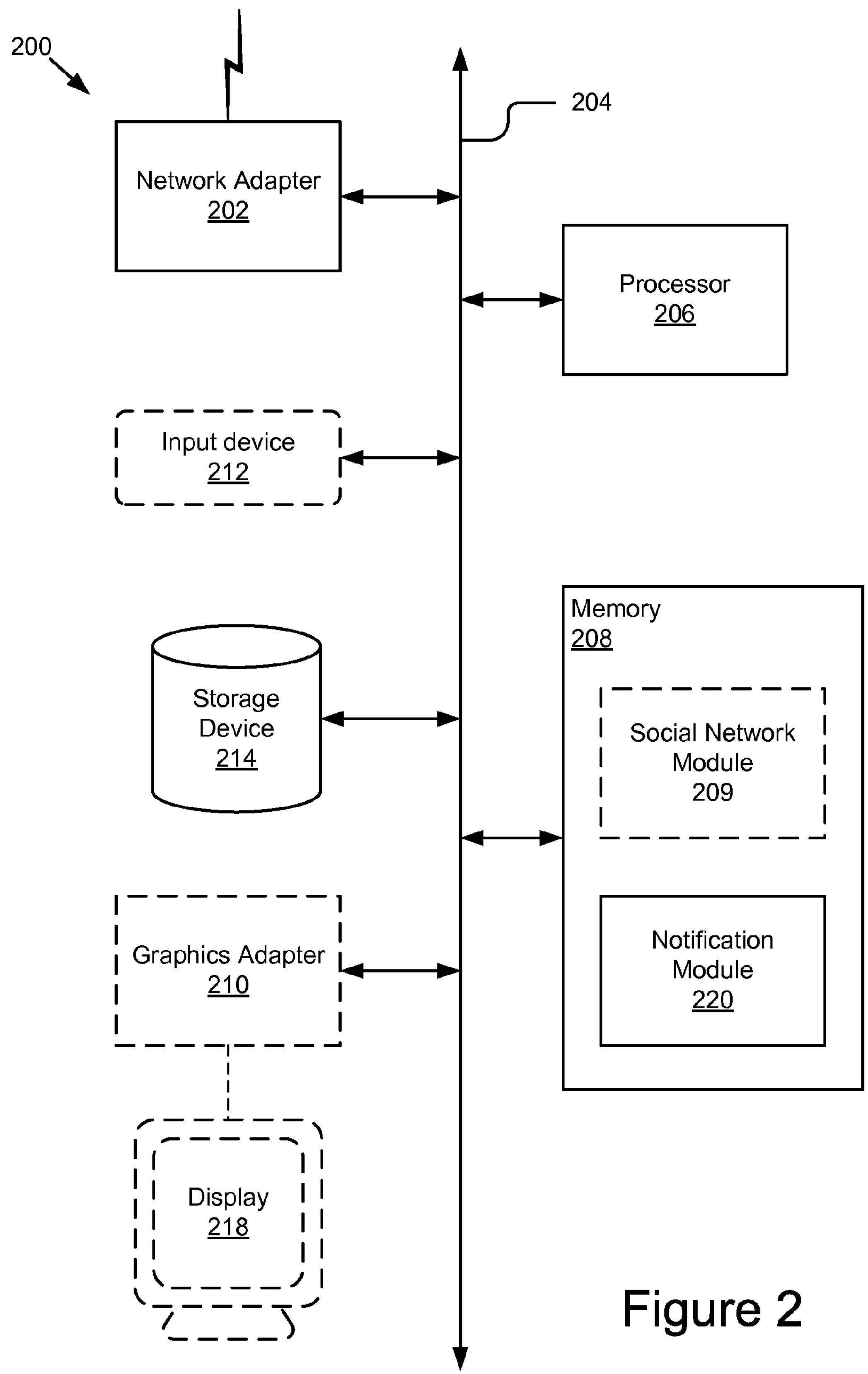
FIG. 2 is a block diagram illustrating an example of a computing device.

FIG. 2 is a block diagram of a computing device 200 according to some implementations. As illustrated in FIG. 2, the computing device 200 includes a network adapter 202 coupled to a bus 204. According to some implementations, also coupled to the bus 204 are at least one processor 206, a memory 208, a graphics adapter 210, an input device 212 and a storage device 214. In some implementations, the memory 208 includes a notification module 220 and an optional social network module 209. In some implementations, the functionality of the bus 204 is provided by an interconnecting chipset. The computing device 200 also includes a display 218, which is coupled to the graphics adapter 210.

The processor 206 may be any general-purpose processor. The processor 206 includes an arithmetic logic unit, a microprocessor, a general purpose controller or some other processor array to perform computations and execute code and routines. The processor 206 is coupled to the bus 204 for communication with the other components of the computing device 200. Processor 206 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be recognized that other processors, operating systems, sensors, displays and physical configurations are possible.

The memory 208 is a non-transitory storage medium. The memory 208 holds instructions and/or data that may be executed by the processor 206. In some implementations, the instructions and/or data stored on the memory 208 include code for performing any and/or all of the techniques described herein. The memory 208 may be a dynamic random access memory (DRAM) device, a static random access memory (SRAM) device, flash memory or some other memory device known in the art. In some implementations, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In some implementations, the notification module 220 is stored in memory 208 and executable by the processor 206. In some implementations, the optional social network module 209 is stored in memory 208 and executable by the processor 206.

The computing device 200, in some implementations, is an application server 101. In some implementations, the application server 101 contains the social network module 209. The social network module 209 is software and routines executable by the processor 206 to control the interaction between the application server 101, storage device 214 and the user devices 115. An implementation of the social network module 209 allows users 125 of user devices 115 to perform social functions between other users 125 of user devices 115 within the system 100. In some implementations, the computing device 200 is an email server 123. In some implementations, the computing device 200 is a third party server 107.

The storage device 214 may be any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and includes one or more devices including a hard disk drive, a floppy disk drive, a CD-ROM device, a DVD-ROM device, a DVD-RAM device, a DVD-RW device, a flash memory device, or some other mass storage device known in the art. In some implementations, the storage device stores the data and information discussed above in reference to the data storage 110.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The notification module 220 is code and routines executable by the processor 206 for dynamically digesting one or more user notifications based at least in part on one or more rules. In some implementations, the notification module 220 is a set of instructions executable by the processor 206. In some implementations, the notification module 220 is stored in the memory 208 and is accessible and executable by the processor 206. Details describing the functionality and components of the notification module 220 are explained in further detail below in reference to FIG. 3.

As is known in the art, a computing device 200 can have different and/or other components than those shown in FIG. 2. For example, the computing device can have speakers or another form of audio output. In addition, the computing device 200 can lack certain illustrated components. For example, in some implementations, the computing device 200 is an application server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In some implementations, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
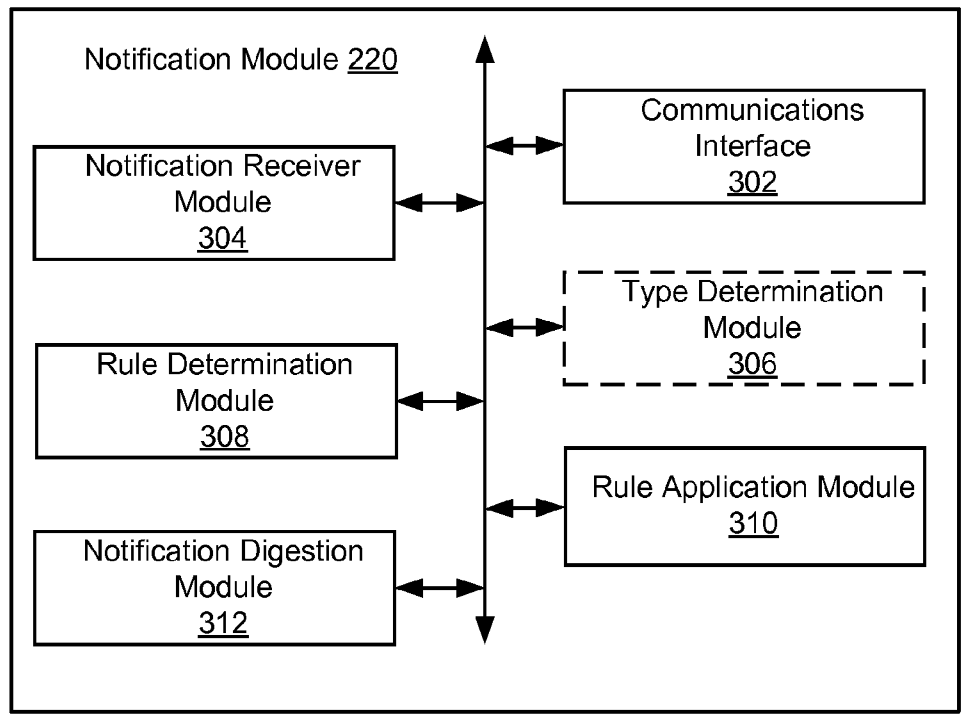
FIG. 3 is a block diagram illustrating an example of a notification module.

Referring now to FIG. 3, the notification module 220 is shown in more detail. FIG. 3 is a block diagram of the notification module 220 included in a computing device 200 (e.g., an application server 101).

In some implementations, the notification module 220 includes a communications interface 302, a notification receiver module 304, an optional type determination module 306, a rule determination module 308, a rule application module 310, and a notification digestion module 312.

It will be recognized that the modules 302, 304, 306, 308, 310, 312 included in the notification module 220 are not necessarily all on the same computing device 200. In some implementations, the modules 302, 304, 306, 308, 310, 312 are distributed across multiple computing devices 200. For example, in some implementations, the modules 302, 304, 306, 308 and 310 are included in the application server 101 and the notification digestion module 310 is included in the e-mail server 123. It will be recognized that the preceding is just an example of distributing modules across multiple computing devices 200 and that other examples exist.

The communication interface 302 is code and routines for handling communications between the notification receiver module 304, the optional type determination module 306 (depending on the implementation), the rule determination module 308, the rule application module 310, the notification digestion module 312 and other components of the computing device 200. In some implementations, the communication interface 302 is a set of instructions executable by the processor 206. In some implementations, the communication interface 302 is stored in the memory 208 and is accessible and executable by the processor 206. In either implementation, the communication interface 302 is adapted for cooperation and communication with the processor 206, other components of the computing device 200 and other components of the notification module 220.

The communication interface 302 handles communications between the notification receiver module 304, the optional type determination module 306 (depending on the implementation), the rule determination module 308, the rule application module 310, the notification digestion module 312 and other components of the computing device 200. For example, the communication interface 202 communicates with the rule determination module 308 and the rule application module 310 to pass the output of the rule determination module 308 (i.e., one or more rules) to the rule application module 310. However, this description may occasionally omit mention of the communication interface 302 for purposes of clarity and convenience. For example, for purposes of clarity and convenience, the above scenario may be described as the rule determination module 308 passing the rules to the rule application module 310.

The notification receiver module 304 is code and routines for receiving one or more notifications. In some implementations, the notification receiver module 304 is a set of instructions executable by the processor 206. In some implementations, the notification receiver module 304 is stored in the memory 208 and is accessible and executable by the processor 206. In either implementation, the notification receiver module 304 is adapted for cooperation and communication with the processor 206, other components of the computing device 200 and other components of the notification module 220.

The notification receiver module 304 is code and routines for receiving one or more notifications. In some implementations, the notification is received responsive to an action of a user. Examples of actions of users include but are not limited to one or more of viewing, posting, indicating approval of, sharing, tagging, commenting, responding, sending, etc. For example, assume a user comments on an account owner's thread, in some implementations, the notification receiver module 304 receives a notification directed to the account owner indicating that the thread was commented on by the user.

In some implementations, the notification receiver module 304 receives a notification when the notification receiver module 304 detects an action of a user activity and issues a notification of the activity. For example, assume the notification receiver module 304 detects that a user has commented on the account owner's thread and issues a notification, in some implementations, the notification receiver module 304 detecting and issuing the notification is receiving the notification. It will be recognized that the preceding are merely examples of receiving a notification and that other examples exist.

In some implementations, the notification receiver module 304 passes the notification to one or more of the optional type determination module 306 and the notification digestion module 312. For example, the notification receiver module 304 is communicatively coupled to one or more of the optional type determination module 306 and the notification digestion module 312 to send the notification to one or more of the optional type determination module 306 and the notification digestion module 312. In some implementations, the notification receiver module 304 (or the communication interface 302) stores the notification in the storage device 214 (or any other non-transitory storage medium communicatively accessible). The other modules of the notification module 220, for example, one or more of the optional type determination module 306 and the notification digestion module 312 can retrieve the notification by accessing the storage device 214 (or other non-transitory storage medium).

The optional type determination module 306 is code and routines for determining a notifications type. In some implementations, the type determination module 306 is a set of instructions executable by the processor 206. In some implementations, the type determination module 306 is stored in the memory 208 and is accessible and executable by the processor 206. In either implementation, the type determination module 306 is adapted for cooperation and communication with the processor 206, other components of the computing device 200 and other components of the notification module 220.

In some implementations, the notification has or is associated with a type occasionally referred to herein as the "type of notification" or "notification type." In some implementations, the notification's type is determined by the optional type determination module 306. For example, the notification received by the notification receiver module 304 is passed to or retrieved by the type determination module 306, which determines the notification type.

In some implementations, the notification type is based at least in part on the action for which the notification was received. For example, assume an action for which a notification is received is a user commenting on the account owner's thread, in some implementations, the type determination module 306 determines the notification is of a thread comment type. It will be recognized that the preceding is only one example of determining a notification type based at least in part on an action and that other examples exist.

In some implementations, the notification type is based at least in part on the frequency of the action for which a notification is received. For example, assume an action for which a notification is received is a user commenting on the account owner's thread. Also, assume that a user commenting on an account owner's thread occurs with high frequency, in some implementations, the type determination module 306 determines the notification is a high frequency notification type. It will be recognized that the preceding is only one example of determining a notification type based at least in part on frequency and that other examples exist.

In some implementations, the notification type is based at least in part on whether the action for which a notification is received is bursty. A bursty action is an action that may or may not occur frequently, but when the action occurs the action is generally repeated multiple times in a short period of time. For example, assume an action for which a notification is received is a user tagging an account owner in a photograph. Assume that a user tagging an account owner in a photograph does not happen frequently; however, when an account owner is tagged in a photograph the account owner is typically tagged in one or more additional photographs soon after, in some implementations, the type determination module 306 determines the notification is a bursty notification type. It will be recognized that the preceding is merely an example of determining a notification type based at least in part on burstiness and that other examples exist.

In some implementations, the notification type is based at least in part on one or more of expected user interest, expected user action and time sensitivity. For example, assume an action for which a notification is received is a user indicating approval of an account owner's post, in some implementations, the type determination module 306 determines the notification is a low interest notification type because a user's approval of a post is relatively uninteresting compared to a user commenting on a post. In another example, assume an action for which a notification is received is a user sending a private message to an account owner, in some implementations, the type determination module 306 determines the notification is an action type notification because an account owner generally takes action (e.g. responds) when a private message is received. In yet another example, assume an action for which a notification is received is a user sending the account owner an invite, in some implementations, the type determination module 306 determines the notification an invite is a time sensitive type of notification. It will be recognized that the preceding are only examples of determining a notification type and notification types and that other examples exist.

In some implementations, the type determination module 306 passes the notification type to the rule application module 310. For example, the type determination module 306 is communicatively coupled to the rule application module 310 to send the notification type to the rule application module 310. In some implementations, the type determination module 306 (or the communication interface 302) stores the notification type in the storage device 214 (or any other non-transitory storage medium communicatively accessible). The other modules of the authentication module 220 including the rule application module 310 can retrieve the notification type by accessing the storage device 214 (or other non-transitory storage medium).

The rule determination module 308 is code and routines for determining one or more rules defining a send condition for a digested notification. In some implementations, the rule determination module 308 is a set of instructions executable by the processor 206. In some implementations, the rule determination module 308 is stored in the memory 208 and is accessible and executable by the processor 206. In either implementation, the rule determination module 308 is adapted for cooperation and communication with the processor 206, other components of the computing device 200 and other components of the notification module 220.

The rule determination module 308 determines one or more rules defining a send condition for a digested notification. In some implementations, the one or more rules include a delay time (DELAY_TIME) and a maximum delay time (MAX_DELAY). In some implementations, the DELAY_TIME determines the maximum delay between receiving a notification and receiving another notification before a send condition occurs. In some implementations, the DELAY_TIME beneficially delays sending a digested notification while notifications continue to be received with some rapidity thereby reducing the number of notifications received by the account owner. In some implementations, the MAX_DELAY determines the maximum delay between receiving a first notification and a send condition occurring. In some implementations, the MAX_DELAY beneficially determines that a digested notification is sent to the account owner even if new notifications are continuously received with some rapidity. In some implementations, the MAX_DELAY is longer than the DELAY_TIME.

In some implementations, the rule determination module 308 determines one or more of the rules based at least in part on notification type. For example, assume notifications include bursty and non-bursty notification types. For example, assume that comments from users on a thread the account owner is associated with come in bursts, and assume the notification receiver module 304 receives a notification responsive to such comments. Also, assume 95% of comments occur 2 hours or less apart, in some implementations, the rule determination module 308 determines the DELAY_TIME to be 2 hours. In another example, assume notifications include time sensitive notifications and non-time sensitive notifications, in some implementations, the notification receiver module 304 determines one or more of the DELAY_TIME and MAX DELAY to be zero for the time sensitive notifications so that they are sent in real time and the DELAY_TIME and MAX DELAY to be non-zero for the non-time sensitive notifications. It will be recognized that the preceding are merely examples of determining one or more rules based on notification type and that other examples exist.

In some implementations, the rule determination module 308 determines one or more of the rules based at least in part on one or more preferences. In some implementations, the one or more preferences include one or more system preferences. For example, assume a system administrator desires to reduce the number of notifications sent to account owners to an absolute minimum, in some implementations, the rule determination module 308 determines one or more of the DELAY_TIME and the MAX_DELAY to be longer. For example, assume that 99% of comments occur 3 hours or less apart, in some implementations, the rule determination module 308 determines the DELAY_TIME to be 3 hours. In another example, assume a system administrator desires to reduce the number of notifications sent to account owners while still keeping account owners engaged, in some implementations, the rule determination module 308 determines one or more of the DELAY_TIME and the MAX_DELAY to be shorter. For example, assume that comment threads last an average of 8 hours, in some implementations, the rule determination module 308 determines the MAX_DELAY to be 4 hours so that the account owner is likely to receive a notification while the thread is still active. It will be recognized that the preceding are merely examples of determining one or more rules based at least in part on one or more system preferences and that other examples exist.

In some implementations, the one or more preferences include one or more user preferences. For example, in some implementations, the account owner can access his/her user settings and select one or more notification settings. For example, assume the one or more notification settings includes a slide bar with settings for sending notifications to the account owner "Rarely," "Occasionally," "Often" and "In Real-time," in some implementations, the rule determination module 308 determines one or more of the DELAY_TIME and the MAX_DELAY based on the setting (e.g. the DELAY_TIME and the MAX_DELAY decrease from left to right). It will be recognized that the preceding is merely an example of determining one or more rules based at least in part on one or more user preferences and that other examples exist.

In some implementations, the rule determination module 308 determines one or more of the rules based at least in part on the account owner's user type. In some implementations, the rule determination module 308 determines one or more rules based at least in part on the account owner's self-selected user type. For example, assume the account owner can self-identify his/her user type by selecting "Power User," "Casual User" and "Infrequent User," in some implementations, the rule determination module 308 determines one or more of the DELAY_TIME and the MAX_DELAY based on the account owner's selection (e.g. the DELAY_TIME and the MAX_DELAY increase from left to right). It will be recognized that the preceding is merely an example of determining one or more rules based at least in part on the account owner's self-selected user type and that other examples exist.

In some implementations, the rule determination module 308 determines the account owner's user type automatically and determines one or more rules based at least in part on the account owner's user type. For example, assume the rule determination module 308 determines the average delay between when a notification is sent to the user and when the acts upon the notification (e.g. by logging into the service from which the notification was sent), in some implementations, the rule determination module 308 determines that the shorter the delay between the notification and the action the more active the user (e.g. a Power User type) and therefore the shorter the DELAY_TIME and/or MAX_DELAY. It will be recognized that the preceding is merely an example of determining one or more rules based at least in part on the account owner's automatically determined user type and that other examples exist.

In some implementations, the rule determination module 308 determines one or more of the rules based at least in part on a plurality of factors including but not limited to one or more of a notification type, a preference, a user type, etc. In some implementations, the rule determination module 308 determines one or more rules based at least in part on the account owner's user type and a user preference. For example, assume the Account Owner A is a "Power User" type and prefers to be sent notifications "Occasionally" and Account Owner B is a "Casual User" type and also prefers to be sent notifications "Occasionally," in some implementations, the rule determination module 308 determines one or more of the DELAY_TIME and the MAX_DELAY based on the account owners' user types and preferences. For example, in some implementations, the rule determination module 308 determines one or more of the DELAY_TIME and the MAX_DELAY to be shorter for Account Owner A because what a "Power User" considers occasional is more frequent than what a "Casual User" considers often. It will be recognized that the preceding is merely an example of determining one or more rules based at least in part on a plurality of factors and that other examples exist.

In some implementations, the one or more rules determined by the rule determination module 308 are dynamic. For example, in some implementations, the rule determination module 308 periodically determines the characteristics of the average comment notification type burst and determines one or more rules according to the characteristics. The characteristics of the average burst are dynamic in that they may change over time as user habits and/or user demographics change; therefore, the one or more rules based at least in part on the characteristics of the burst are also dynamic. In another example, one or more of the rules may be dynamically altered based at least in part on a quiet period (QUIET_PERIOD). In some implementations, the quiet period refers to the notifications. For example, assume a QUIET_PERIOD is stored and refers to the amount of time since a digested notification has been sent to an account owner or received by the notification receiver module 304 (depending on the implementation), in some implementations, the rule determination module 308 sets the DELAY_TIME using the formula DELAY_TIME=k/QUIET_PERIOD where k is scalar value (e.g. 1). This formula adjusts the DELAY_TIME inversely to the QUIET_PERIOD such that the longer the quiet period the shorter the delay and the shorter the quiet period the longer the delay. Such a formula may beneficially determine delay times that may reengage low activity users prevent high activity users from being overwhelmed with notifications. It will be recognized that the preceding are merely examples of determining one or more dynamic rules and that other examples exist.

In some implementations, one or more of the rules determined by the rule determination module 308 are predefined. In some implementations, the one or more pre-defined rules are based at least in part on one or more of a study and a survey. For example, assume an online service conducts a study or a survey and determines that account owners that select to receive notifications "Occasionally" generally prefer to receive a notification within 8 hours of an action occurring, but do not want to receive more than 4 notices a day, in some implementations, the MAX_DELAY is pre-defined (i.e. determined) to be 8 hours and the DELAY_TIME is pre-defined (i.e. determined) to be 6 hours by a system administrator. In some implementations, the rule determination module 308 then determines that those pre-defined rules apply to Account Owner A because his/her user notification setting is set to "Occasionally." It will be recognized that the preceding is merely an example of pre-defined rules and that other examples exist.

In some implementations, the rule determination module 308 passes the rules to the rule application module 310. For example, the rule determination module 308 is communicatively coupled to the rule application module 310 to send the rules to the rule application module 310. In some implementations, the rule determination module 308 (or the communication interface 302) stores the rules in the storage device 214 (or any other non-transitory storage medium communicatively accessible). The other modules of the notification module 220 including the rule application module 310 can retrieve the rules by accessing the storage device 214 (or other non-transitory storage medium).

The rule application module 310 is code and routines for applying the one or more rules and determining when a send condition for a digested notification has occurred. In some implementations, the rule application module 310 is a set of instructions executable by the processor 206. In some implementations, the rule application module 310 is stored in the memory 208 and is accessible and executable by the processor 206. In either implementation, the rule application module 310 is adapted for cooperation and communication with the processor 206, other components of the computing device 200 and other components of the notification module 220.

The rule application module 310 applies one or more rules and determines when a send condition for a digested notification has occurred. In some implementations, a send condition occurs when a notification is not received prior to the expiration of the DELAY_TIME. For example, assume a first notification is received by the notification receiver engine 304. Also, assume that the rule application module 310 obtains (e.g. receives from the rule determination module 308 or retrieves from the storage device 214) the DELAY_TIME and MAX_DELAY which are 20 minutes and 4 hours, respectively. In some implementations, the rule application module 310 determines a send condition has occurred when a second notification is not received within 20 minutes of the first notification. It will be recognized that the preceding is merely an example of a send condition occurring when a notification is not received prior to the expiration of a DELAY_TIME and that other examples exist.

In some implementations, a send condition occurs when the MAX_DELAY is reached. For example, assume a first notification is received by the notification receiver engine 304 at noon. Also, assume that the DELAY_TIME and MAX_DELAY are determined by the rule determination module 308 to be 20 minutes and 4 hours, respectively, and that a notification is being received by the notification receiver engine approximately every 15 minutes (i.e. less than the DELAY_TIME) from noon to 3:45 PM and from 4:01 PM to 7:46 PM.

In some implementations, the rule application module 310 determines a send condition occurs when the MAX_DELAY is reached at 4 PM (i.e. 4 hours after the first notification that was received at noon). In some implementations, when a send condition occurs, the rule application module 310 resets one or more of the DELAY_TIME and MAX_DELAY. For example, in the above example, in some implementations, the rule application module 310 resets the MAX_DELAY responsive to receiving the first notification after the previous send condition (i.e. the 4:01 PM notification), and the rule application module 310 determines that a send condition occurs at 8:01 PM (i.e. 4 hours after the first notification at 4:10 PM). It will be recognized that the preceding are merely examples of a send condition occurring when a MAX_DELAY is reached and that other examples exist.

In some implementations, the rule application module 310 applies the one or more rules and determining when a send condition has occurred based at least in part on notification type. For example, assume a first notification having a first type is received by the notification receiver engine 304 at 9:00 AM and a second notification of a second type is received at 9:15 AM. Also, assume that the DELAY_TIME and MAX_DELAY for the first type of notification are determined by the rule determination module 308 to be 20 minutes and 4 hours, respectively. In some implementations, the rule application module 310 determines a send condition has occurs at 9:20 AM because the second notification is of a different type than the first notification and therefore the rule application module 310 does not reset the DELAY_TIME when the second notification is received within 20 minutes of the first notification. It will be recognized that the preceding is merely an example of applying the one or more rules and determining when a send condition has occurred based at least in part on notification type and that other examples exist.

In some implementations, when the rule application module 310 determines that a send condition has occurred, the rule application module 310 prompts the notification digestion module 312 to digest one or more of the notification received prior to the send condition and send a digested notification. The prompt is occasionally referred to herein as a "send signal."

In some implementations, the rule application module 310 passes the send signal to the notification digestion module 312. For example, the rule application module 310 is communicatively coupled to the notification digestion module 312 to send the send signal to the notification digestion module 312. In some implementations, the rule application module 310 (or the communication interface 302) stores the send signal in the storage device 214 (or any other non-transitory storage medium communicatively accessible). The other modules of the notification module 220 including the notification digestion module 312 can retrieve the send signal by accessing the storage device 214 (or other non-transitory storage medium).

The notification digestion module 312 is code and routines for digesting one or more notifications received prior to a send condition and sending a digested notification to the account owner. In some implementations, the notification digestion module 312 is a set of instructions executable by the processor 206. In some implementations, the notification digestion module 312 is stored in the memory 208 and is accessible and executable by the processor 206. In either implementation, the notification digestion module 312 is adapted for cooperation and communication with the processor 206, other components of the computing device 200 and other components of the authentication module 220.

The notification digestion module 312 digests one or more notifications received prior to a send condition and sends a digested notification to the account owner. The digestion performed by the notification digestion module 312 is occasionally referred to as "dynamic" because the digestion is not scheduled for a fixed time or interval (e.g. every Thursday at 9 AM). Rather, the digestion time is dynamic because it depends on one or more rules (e.g. the DELAY_TIME and MAX_DELAY) and the timing of the one or more received notifications (e.g. whether another notification is received within the TIME_DELAY).

In some implementations, the notification digestion module 312 digests one or more notifications received between the time of the first notification to the time of the second send condition, inclusive. As used herein, a first notification occasionally refers to the first notification received after a digested notification has been sent. For example, assume a digested notification is sent after six notifications are received then a seventh notification is received, in some implementations, that seventh notification is a first notification. It will be recognized that the preceding is merely an example of a first notification and that other examples exist.

In some implementations, the notification digestion module 312 digests one or more notifications based at least in part on notification type. For example, assume notifications that a user has tagged the account owner in photographs (i.e. a first type of notification) and that a user has commented on a post associated with the user (i.e. a second type of notification) are received. Also, assume that a send condition has occurred for the photograph tagging (e.g. the photo tagging burst is over) while users continue to comment on the post (e.g. the commenting burst continues). In some implementations, the notification digestion module 312 digests the one or more photograph tagging notifications when the send condition for the first type of notification (i.e. photograph tagging) occurs, and digests the one or more comment notifications when the send condition for the second type of notification (i.e. commenting on a post) occurs. Therefore, in some implementations, the account owner receives separate digested notifications for each notification type. A first digested notification for the photograph tagging burst and a second digested notification for the commenting burst. It will be recognized that the preceding is merely an example of digesting one or more notifications received based at least in part on notification type and that other examples exist.

In some implementations, notification digestion module 312 digests one or more notifications regardless of notification type. For example, assume again that notifications that a user has tagged the account owner in photographs (i.e. a first type of notification) and that a user has commented on a post associated with the user (i.e. a second type of notification) are received. Also, assume that a send condition has occurred for the photograph tagging (e.g. the photo tagging burst is over) while users continue to comment on the post (e.g. the commenting burst continues). In some implementations, the notification digestion module 312 digests the one or more photograph tagging notifications and the commenting notifications received prior to the send condition for the first type of notification (i.e. photograph tagging). Therefore, in some implementations, the account owner receives at least two digested notifications according to this example. A first digested notification for the photograph tagging burst and comments prior to the first send condition and a second digested notification for the comment notifications after the first send condition. It will be recognized that the preceding is merely an example of digesting one or more notifications received regardless of notification type and that other examples exist.

In some implementations, the digested notification includes a summary of the one or more digested notifications. In some implementations, a summary of the one or more digested notifications include but are not limited to one or more of the type(s) of the one or more digested notifications (e.g. "A user tagged you in a photograph."), a total of the number of digested notification (e.g., "You've received 7 notifications."), a subtotal of the number of digested notifications based at least on type (e.g. "You've been tagged in a photo 3 times and have received 4 messages."), whether more notifications are pending or expected, in some implementations, the notification may include "You've received 15 notifications but expect more."), etc. It will be recognized that the preceding are merely examples of a summary and a digested notification and that other examples exist.

In some implementations, the notification digestion module 312 sends the digested notification for display to the account owner. Examples of sending a digested notification include but are not limited to sending a digested notification via e-mail, short message service (SMS) text, push notification, etc. It will be recognized that the preceding are merely examples of sending a digested notification and that other examples exist.

Figure 4:
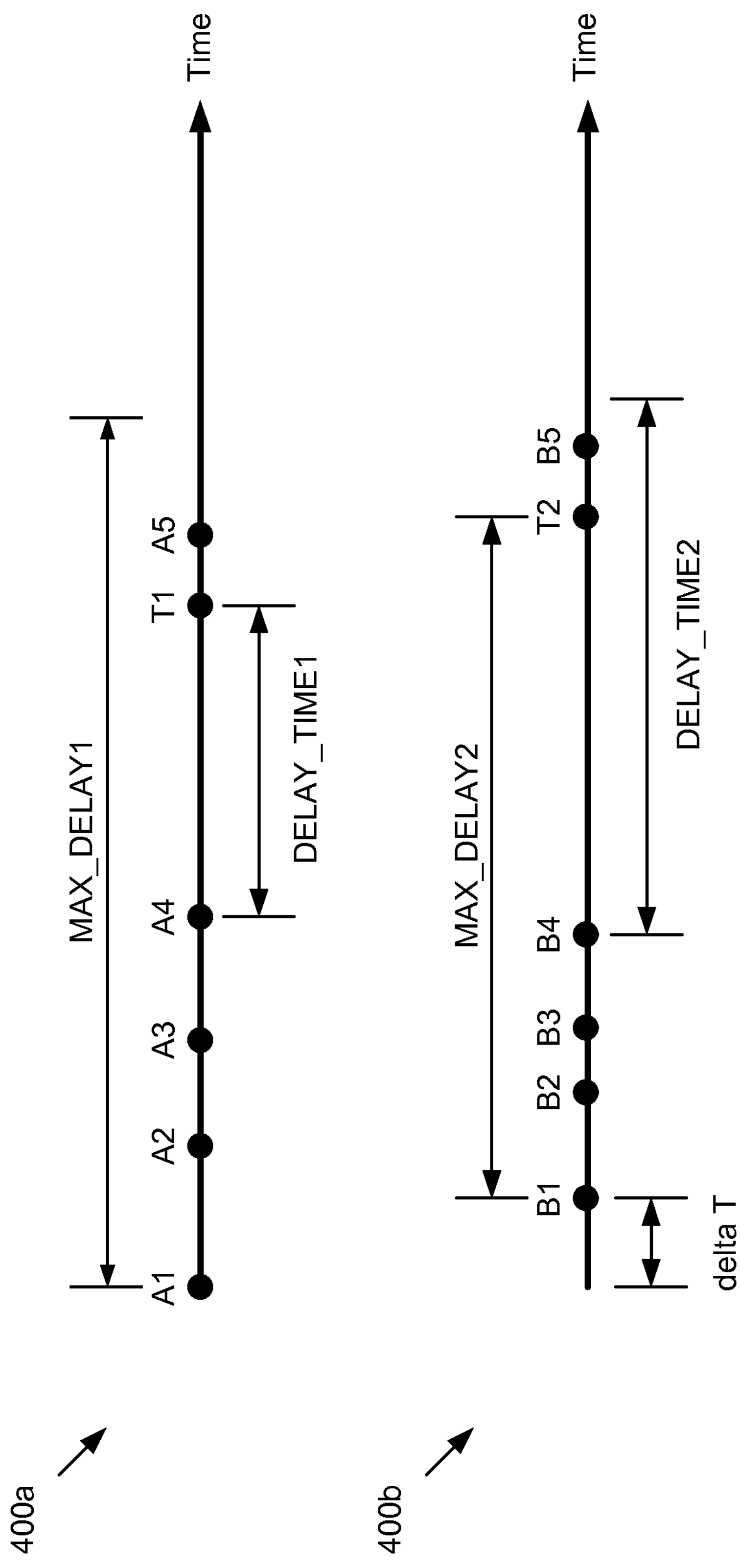
FIG. 4 illustrates example notification timelines and operations of the notification module according some implementations.

FIG. 4 illustrates example notification timelines 400*a* and 400*b* and operations of the notification module 220 according to one or more implementations. It will be recognized that the timelines 400*a* and 400*b* are merely examples of timelines and that other timelines exist. Moreover, it will be recognized that the following scenarios discussed in reference to the timelines 400*a* and 400*b* are merely examples provided for simplicity and clarity and not intended to be all-inclusive of the functionality of the notification module 220.

Timeline 400*a* illustrates an example of an implementation in which a send condition is sent at time T1 responsive to the rule application module 310 determining that a notification has not been received within the DELAY_TIME1 as determined by the rule determination module 308. As illustrated, the notification receiver module 304 receives the other notifications A2-5 within the MAX_DELAY1 time determined by the rule determination module 306 as measured from the time of the first notification A1. Therefore, the rule application module 310 does not send a digested notification responsive to the MAX_DELAY1 being reached. Rather, in the illustrated implementation, the rule application module 310 determines that a send condition occurs because the time between the fourth notification A4 and the fifth notification A5 exceeds the DELAY_TIME1. Therefore, at time T1 the notification digestion module 312 is prompted to digest the first four notifications A1-4 and send the digested notification to the account owner. In some implementations, the fifth notification A5 is then the first notification for a subsequent digested notification and the rule application module 310 resets one or more of the MAX_DELAY1 and DELAY_TIME1 accordingly (not shown).

Timeline 400*b* illustrates an example of an implementation in which a send condition is sent at time T2 responsive to a determination by the rule application module 310 that the MAX_DELAY2 time as determined by the rule determination module 308 has been reached. As illustrated, the notification receiver module 304 received notification B2 within the DELAY_TIME2 of notification B1, notification B3 within the DELAY_TIME2 of notification B2, notification B4 within the DELAY_TIME2 of notification B3, and notification B5 within the DELAY_TIME2 of notification B4. Therefore, the rule application module 310 does not send a digested notification responsive to a notification not being received within DELAY_TIME2. Rather, in the illustrated implementation, the rule application module 310 determines that a send condition occurs responsive to the MAX_DELAY2 being reached. Therefore, at time T2 the notification digestion module 312 is prompted to digest the first four notifications B1-4 and send the digested notification to the account owner. In some implementations, the fifth notification B5 is then the first notification for a subsequent digested notification and the rule application module 310 resets one or more of the MAX_DELAY2 and DELAY_TIME2 accordingly (not shown).

In some implementations, timeline 400*a* and 400*b* are concurrent; however, notifications A1-5 are of a first notification type and associated with DELAY_TIME1 and MAX_DELAY1 as determined by the rule determination engine 308, and notifications B1-5 are of a second notification type and associated with DELAY_TIME2 and MAX_DELAY2 as determined by the rule determination engine 308. As illustrated, notification B1 is received at a time delta T after notification A1 is received, and the send condition at time T1 precedes the send condition at time T2. In some implementations, the notification and digestion module 312 digests the one or more notifications received prior to a send condition regardless of notification type, so the notification and digestion module 312 digests notifications A1-4 and B1-4 at time T1. In some implementations, the notification and digestion module 312 digests the one or more notifications received prior to a send condition based at least in part on notification type, so the notification and digestion module 312 digests notifications A1-4 at time T1 and digests notifications B1-4 separately at time T2.

FIG. 7 illustrates an example of a storage device 214 storing user data 700. In some implementations, the user data 700 includes user notification rules 730*a* and other user data 730*n*. In some implementations, the user notification rules 730*a* include one or more of rules 750*a*, notification type based rules 750*b*, user type based rules 750*c* and other rules 750*n*. It will be recognized that the preceding 750*a*-750*n* are merely examples of user notification rules 730*a* and that the user notification rules 730*a* may include more, less or different rules 750*a*-750*n* depending upon the implementation.

As illustrated, in some implementations, the notification type based rules 750*b* includes one or more delay times 770*a*-770*n* and maximum delay times 772*a*-*n*. It will be recognized that although the notification type based rules 750*b* is shown including a data structure including one or more delay times 770*a*-770*n* and maximum delay times 772*a*-*n*, the other rules, e.g., rules 750*a*, user type based rules 750*c*, other rules 750*n*, may include the same or similar data structures and similar data.

In some implementations, the user data 700 includes data belonging to account owner User A 710*a*. In this example, User A's data 710*a* includes data for the User A's profile 720*a*, user settings 720*b* as well as other data 720*n* associated with User A. In some implementations, the user settings data 720*b* includes data regarding notification settings 740*a* and other user settings 740*n*. In some implementations, the notification settings 740*a* include one or more delay times 780*a*-780*n* and maximum delay times 782*a*-*n*. In some implementations, the user associated data 720*n* includes a user type 760*n* and other user associated data 760*n*.

It will be recognized that although User A's data 710*a* is shown including a data structure including multiple other types of data, the data for other users, e.g., User B's data 710*b* and User N's data 710*n*, may include the same or similar data structures and data. It will be further recognized that the preceding is merely an example of the kind of data and data structure possible in a storage device 214 and that other examples exist. For example, in some implementations, the data structure may be different and/or include more, less, different or other data types and categories.

Figure 5:
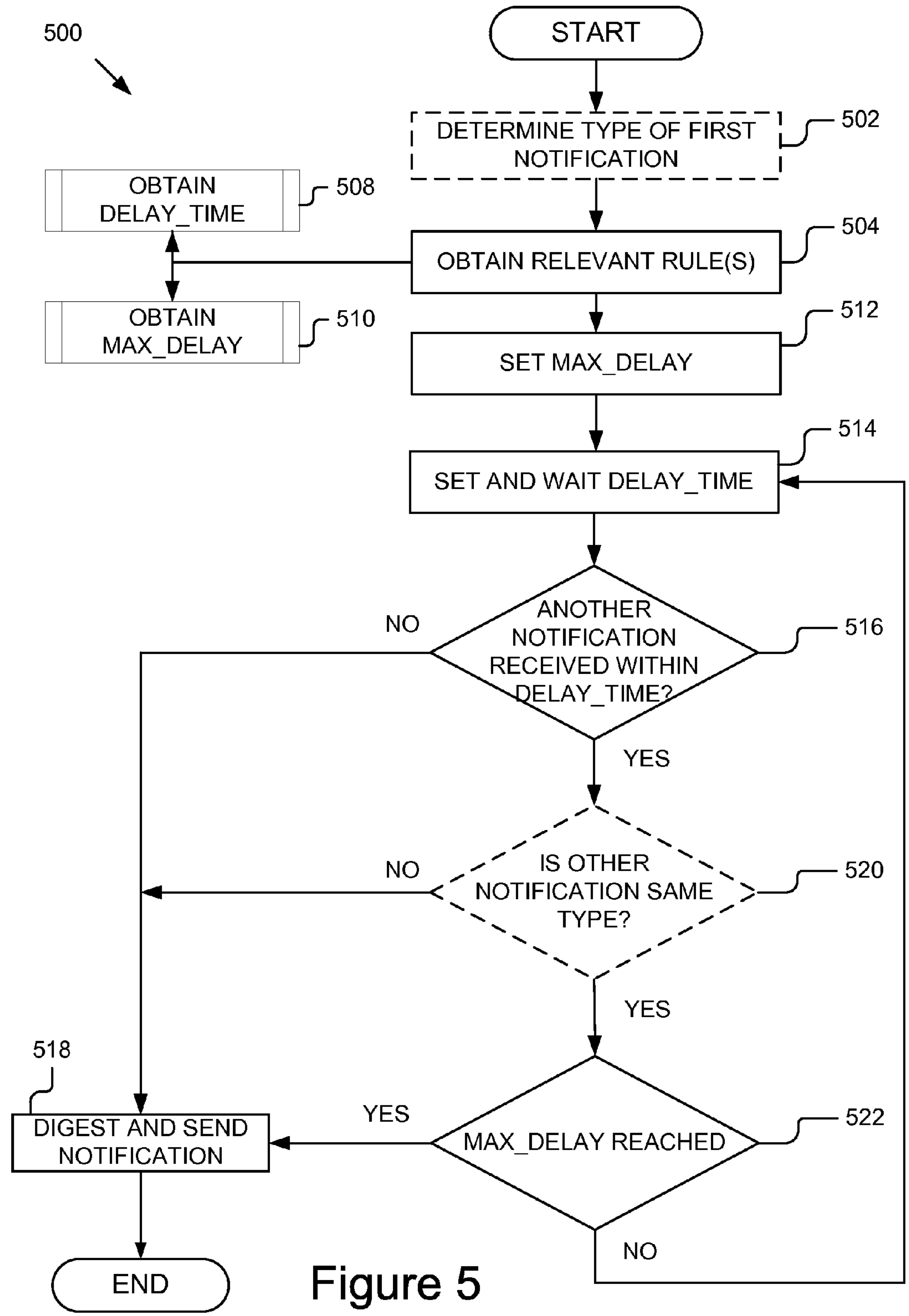
FIG. 5 is a flow chart illustrating an example method for dynamically digesting one or more user notifications.

FIGS. 5 and 6 depict various methods 500, 600 performed by the system described above in reference to FIGS. 1-3 and 6. Steps that are optional or performed by optional modules are depicted in dashed boxes.

FIG. 5 is a flow chart illustrating a method 500 for dynamically digesting one or more user notifications based at least in part on one or more rules according to some implementations. A notification can be received by the notification receiver module 304 of the notification module 220 (not shown). At step 502, the optional type determination module 306 determines the type of the notification received by the notification receiver module. At step 504, the rule application module 310 obtains the relevant rules, for example, in some implementations, the rule application module 310 obtains a delay time at step 508 and a max delay time at step 510. At step 512, the rule application module 310 sets the maximum delay time.

At step 514, the rule application module 310 sets the delay time and waits the delay time. At step 516, the rule application module 310 determines whether another notification was received within the delay time. If the rule application module 310 determines that another notification is not received within the delay time (516-No), the rule application module 310 determines that a send condition has occurred and the notification digestion module 312 digests one or more notifications preceding the send condition and sends a digested notification at step 518. If the rule application module 310 determines that another notification is received within the delay time (516-Yes), depending on the implementation, the rule application module 310 determines whether the another notification is of the same type at step 520 or determines whether the maximum delay is reached at step 522.

In some implementations, the method continues at step 520. If the rule application module 310 determines that another notification is not of the same type (520-No), the rule application module 310 determines that a send condition has occurred and the notification digestion module 312 digests one or more notifications preceding the send condition and sends a digested notification at step 518.

If the rule application module 310 determines that another notification is of the same type (520-Yes) or if the optional step 520 is skipped, the method continues at step 522. At step 522, rule application module 310 determines whether the maximum delay has been reached. If the rule application module 310 determines that maximum delay has been reached (522-Yes), the rule application module 310 determines that a send condition has occurred and the notification digestion module 312 digests one or more notifications preceding the send condition and sends a digested notification at step 518. If the rule application module 310 determines that maximum delay has not been reached (522-No), the rule application module 310 resets the delay time at step 514 and steps 514-522 are repeated until a send condition occurs and the notification digestion module 312 digests one or more notifications preceding the send condition and sends a digested notification at step 518.

Figure 6:
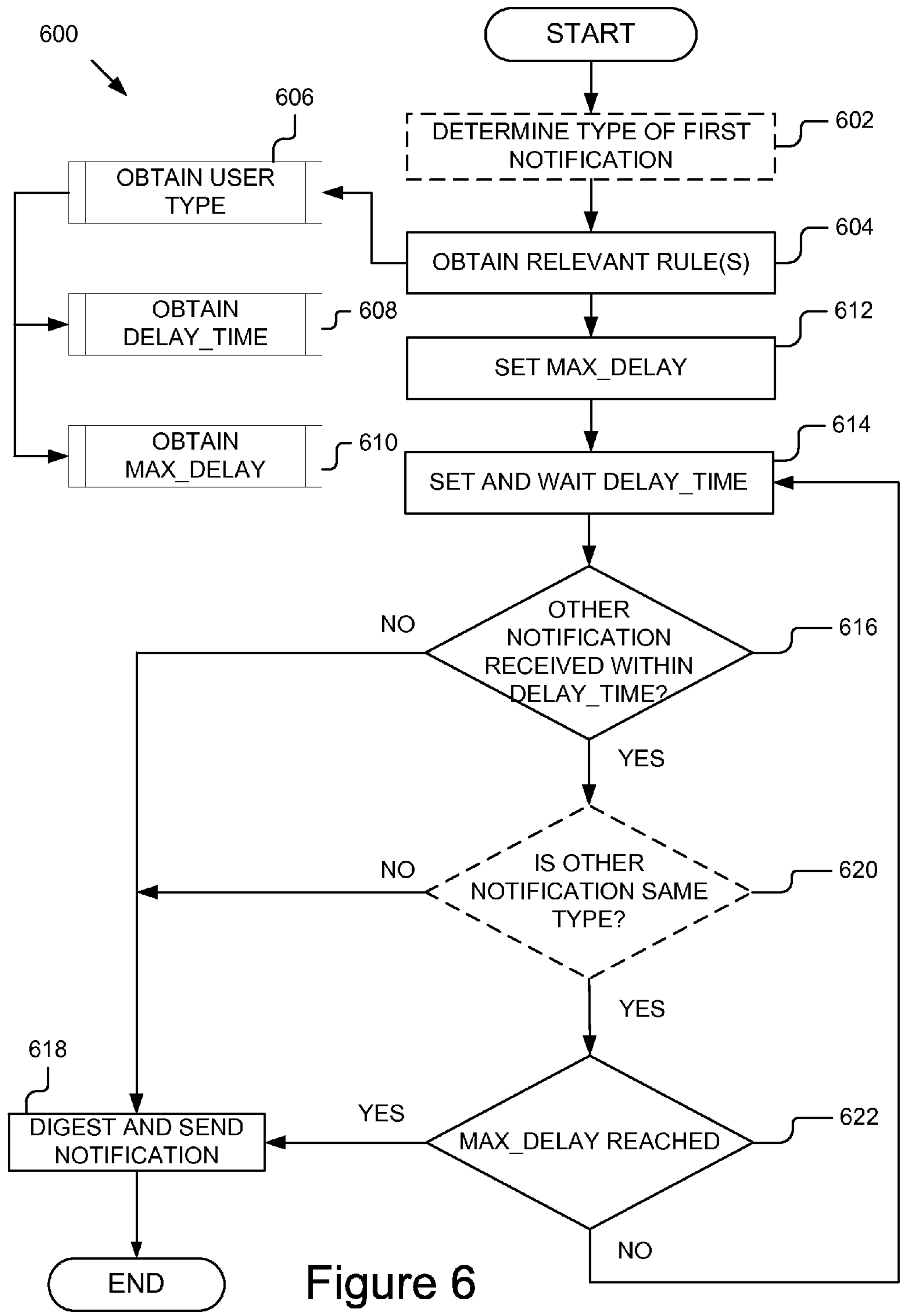
FIG. 6 is a flow chart illustrating another example method for dynamically digesting one or more user notifications.

FIG. 6 is a flow chart illustrating another method 600 for dynamically digesting one or more user notifications based at least in part on one or more rules according to another implementation. A notification is received by the notification receiver module 304 of the notification module 220 (not shown). At step 602, the optional type determination module 306 determines the type of the notification received by the notification receiver module. At step 604, the rule application module 310 obtains the relevant rules, for example, in some implementations, the rule application module 310 obtains the account owner's user type at step 606 and a delay time based at least in part on the account owner's user type at step 608 and a max delay time based at least in part on the account owner's user type at step 610. At step 612, the rule application module 310 sets the maximum delay time.

At step 614, the rule application module 310 sets the delay time and waits the delay time. At step 616, the rule application module 310 determines whether another notification was received within the delay time. If the rule application module 310 determines that another notification is not received within the delay time (616-No), the rule application module 310 determines that a send condition has occurred and the notification digestion module 312 digests one or more notifications preceding the send condition and sends a digested notification at step 618. If the rule application module 310 determines that another notification is received within the delay time (616-Yes), depending on the implementation, the rule application module 310 determines whether the another notification is of the same type at step 620 or determines whether the maximum delay is reached at step 622.

In some implementations, the method continues at step 620. If the rule application module 310 determines that another notification is not of the same type (620-No), the rule application module 310 determines that a send condition has occurred and the notification digestion module 312 digests one or more notifications preceding the send condition and sends a digested notification at step 618.

If the rule application module 310 determines that another notification is of the same type (620-Yes) or if the optional step 620 is skipped, the method continues at step 622. At step 622, rule application module 310 determines whether the maximum delay has been reached. If the rule application module 310 determines that maximum delay has been reached (622-Yes), the rule application module 310 determines that a send condition has occurred and the notification digestion module 312 digests one or more notifications preceding the send condition and sends a digested notification at step 618. If the rule application module 310 determines that maximum delay has not been reached (622-No), the rule application module 310 resets the delay time at step 614 and steps 614-622 are repeated until a send condition occurs and the notification digestion module 312 digests one or more notifications preceding the send condition and sends a digested notification at step 618.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement some implementations or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method comprising:

receiving a first notification in response to an action from a first user;

determining a type for the first notification;

obtaining rules for determining a send condition, the rules include a delay time based at least in part on a user type of the first user;

receiving a second notification;

determining whether the second notification is of a same type as the first notification;

responsive to the second notification being of the same type, determining whether the delay time has been reached; and responsive to the delay time being reached, determining the send condition has occurred and digesting the first and second notification received based at least in part on the type of notification prior to the send condition.

2. The computer-implemented method of claim 1, wherein the type of notification is based at least in part on the action from the first user.

3. The computer-implemented method of claim 1, wherein the type of notification is based at least in part on one or more of expected interest of the first user, expected user action, and time sensitivity.

4. The computer-implemented method of claim 1, further comprising:

determining an average delay parameter between the first notification and the second notification.

5. The computer-implemented method of claim 1, further comprising:

determining a max delay time based as least in part on the user type of the first user; and setting the delay time as the max delay time.

6. The computer-implemented method of claim 1, wherein the delay time is determined based on notification settings associated with a profile of the first user.

7. The computer-implemented method of claim 1, further comprising:

responsive to the first and second notification not being received during the delay time, queuing the first and second notification for a send condition that will occur when the delay time is satisfied.

8. A computer program product comprising a tangible non-transitory computer readable medium encoding instructions that, in response to execution by a computing device, cause the computing device to perform operations comprising:

receiving a first notification in response to an action from a first user;

determining a type for the first notification;

obtaining rules for determining a send condition, the rules include a delay time based at least in part on a user type of the first user;

receiving a second notification;

determining whether the second notification is of a same type as the first notification;

responsive to the second notification being of the same type, determining whether the delay time has been reached; and responsive to the delay time being reached, determining the send condition has occurred and digesting the first and second notification received based at least in part on the type of notification prior to the send condition.

9. The computer program product of claim 8, wherein the type of notification is based at least in part on the action from the first user.

10. The computer program product of claim 8, wherein the type of notification is based at least in part on one or more of expected interest of the first user, expected user action, and time sensitivity.

11. The computer program product of claim 8, further comprising:

determining an average delay parameter between the first notification and the second notification.

12. The computer program product of claim 8, further comprising:

determining a max delay time based as least in part on the user type of the first user; and setting the delay time as the max delay time.

13. The computer program product of claim 8, wherein the delay time is determined based on notification settings associated with a profile of the first user.

14. A system comprising:

one or more memories; and one or more memories storing instructions that, when executed by the one or more processors, cause the system to:

receive a first notification in response to an action from a first user;

determine a type for the first notification;

obtain rules for determining a send condition, the rules include a delay time based at least in part on a user type of the first user;

receive a second notification;

determine whether the second notification is of a same type as the first notification;

responsive to the second notification being of the same type, determine whether the delay time has been reached; and responsive to the delay time being reached, determine the send condition has occurred and digesting the first and second notification received based at least in part on the type of notification prior to the send condition.

15. The system of claim 14, wherein the type of notification is based at least in part on the action from the first user.

16. The system of claim 14, wherein the type of notification is based at least in part on one or more of expected interest of the first user, expected user action, and time sensitivity.

17. The system of claim 14, further comprising:

determining an average delay parameter between the first notification and the second notification.

18. The system of claim 14, further comprising:

determining a max delay time based as least in part on the user type of the first user; and setting the delay time as the max delay time.

19. The system of claim 14, wherein the delay time is determined based on notification settings associated with a profile of the first user.

20. The system of claim 14, further comprising:

responsive to the first and second notification not being received during the delay time, queuing the first and second notification for a send condition that will occur when the delay time is satisfied.

* * * * *